T. McDONOUGH.
Harvester-Dropper.
No. 165,454. Patented July 13, 1875.
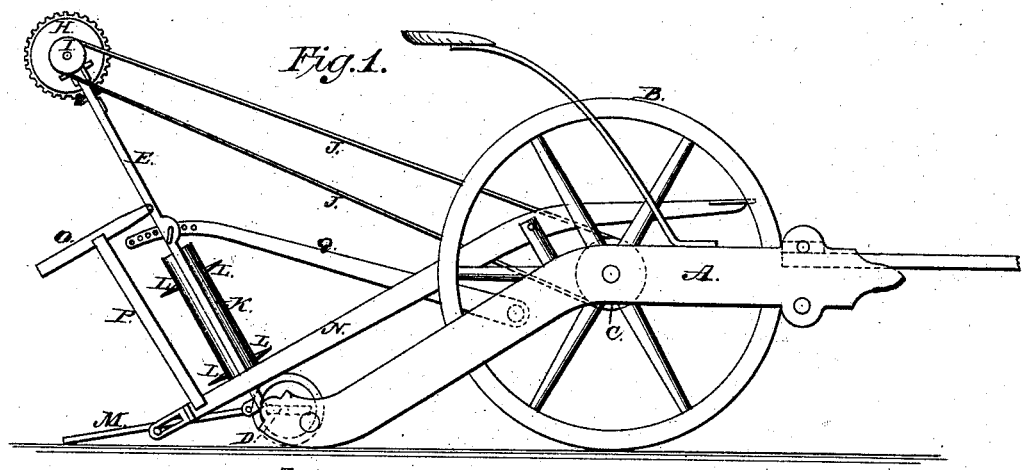
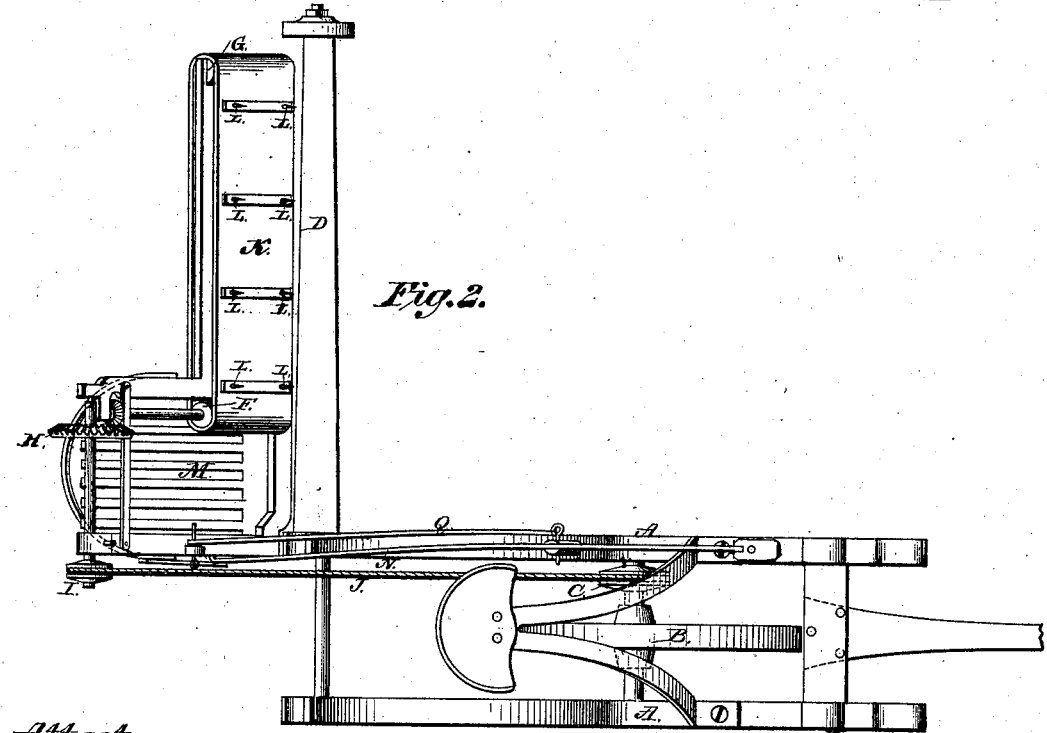
Attest:
Edward Rose
Reoson Wilson
Inventor:
Thomas McDonough

UNITED STATES PATENT OFFICE.

THOMAS McDONOUGH, OF OTTAWA, ILLINOIS, ASSIGNOR OF ONE-FOURTH HIS RIGHT TO E. K. WALBRIDGE, OF SAME PLACE.

IMPROVEMENT IN HARVESTER-DROPPERS.

Specification forming part of Letters Patent No. 165,454, dated July 13, 1875; application filed April 9, 1875.

*To all whom it may concern:*

Be it known that I, THOMAS McDONOUGH, of Ottawa, in the county of La Salle and State of Illinois, have invented certain Improvements in a Self Raking and Dropping Attachment to Harvesters, of which the following is a specification:

This invention relates to that class of harvesters which drop the grain in bundles the proper size to be tied by persons following the machine; and consists in the attachment to an ordinary reaper or mower of an adjustable frame, inclined backward, on which moves an endless apron provided with spiked slats, so as to bring the cut grain into an opening to the right or left of the machine, where it drops out on one side out of the way of the horses on their return trip.

The second part of my invention consists in a dropper attached to the frame aforesaid, which dropper is worked by means of a lever by the driver's foot, discharging the bundle that has accumulated on it, when, by releasing the lever, the dropper comes back in place to receive a new charge.

The third part of my invention consists in a guard combined with the dropper in such a manner that when the dropper is down discharging the grain, the guard meanwhile receives such grain as is being carried along, and holds the same from falling down and scattering until the return of the dropper.

Figure 1 is a side elevation of a machine embodying my invention. Fig. 2 is a plan of the same.

A is the frame of the machine, in which turns the ground-wheel B, having on its shaft the pulley C. D is the finger-bar, and it has hinged to it the inclined adjustable frame E, which carries two rollers, F and G. The roller F carries on its shaft a small bevel-wheel, which gears into a larger wheel, H. On the shaft of wheel H is a pulley, I, over which and the pulley C passes a chain, J. This gives motion to the rollers F and G, over which passes an apron, K, covered at intervals with slats through which are passed spikes L L L. Next to the roller F is an opening in the frame E, into which the grain is carried by the apron K, and where it falls onto a dropper, M. This dropper is hinged to the frame E, and the lever N works the outer end up and down, so as to enable the operator to drop the bundle of grain accumulated on the dropper, which he does by releasing the lever N on which he keeps his foot.

The driver has of course to use his own judgment and discretion as to the size of the bundle which he drops at each operation.

While the dropper is down and discharging the grain, the incoming grain is prevented from falling down by the guard O, which is connected with the lever N by a rod, P, so that the guard O and dropper M go up and down together. The adjustable frame E is held in any desired position by the brace Q, one end of which is bolted to the frame A, while the other end, passing through the frame E, has a series of holes through which a pin is inserted.

It is plain that the raking and dropping attachment, consisting chiefly of the frame E, rollers F and G, apron K, and dropper M, can be attached to any existing reaper or mower.

What I claim as my invention, and desire to secure by Letters Patent, is—

1. The inclined adjustable frame E, with brace Q, rollers F and G, and apron K, as an attachment to a reaper, substantially as and for the purpose described.

2. The inclined adjustable frame E, in combination with the dropper M and lever N, substantially as and for the purpose described.

3. The inclined adjustable frame E and dropper M, in combination with the guard O and rod P, substantially as and for the purpose described.

THOMAS McDONOUGH.

Witnesses:
EDWARD ROSE,
REASON WILSON.